United States Patent
Doi (10) Patent No.: US 9,424,664 B2
(45) Date of Patent: Aug. 23, 2016

(54) IMAGE PROCESSING APPARATUS

(71) Applicant: Oki Data Corporation, Tokyo (JP)

(72) Inventor: Toshihiro Doi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/526,012

(22) Filed: Oct. 28, 2014

(65) Prior Publication Data

US 2015/0117778 A1    Apr. 30, 2015

(30) Foreign Application Priority Data

Oct. 30, 2013    (JP) ................. 2013-225616

(51) Int. Cl.
*G06T 9/20* (2006.01)
*H04N 1/409* (2006.01)

(52) U.S. Cl.
CPC .............. *G06T 9/20* (2013.01); *H04N 1/4092* (2013.01)

(58) Field of Classification Search
CPC ..... H04N 1/4092; H04N 5/142; H04N 9/646; G06T 2207/10024; G06T 5/20; G06T 2207/20192; G06T 2207/20012; G06T 5/002; G06T 9/20
See application file for complete search history.

(56) References Cited

U.S. PATENT DOCUMENTS

| | | | | |
|---|---|---|---|---|
| 5,387,983 A * | 2/1995 | Sugiura | ............... | H04N 1/40075 358/434 |
| 5,570,432 A * | 10/1996 | Kojima | ................. | G06K 15/02 358/453 |
| 5,754,708 A * | 5/1998 | Hayashi | ............. | H04N 1/40062 358/3.24 |
| 5,760,922 A * | 6/1998 | Kojima | .............. | H04N 1/40075 358/3.1 |
| 6,366,358 B1 * | 4/2002 | Satou | .................. | B41F 33/0036 358/1.14 |
| 6,466,693 B1 * | 10/2002 | Otsu | ........................ | G06K 9/38 358/466 |
| 7,024,043 B1 * | 4/2006 | Fujimoto | ................. | G06K 9/38 358/2.1 |
| 7,352,490 B1 * | 4/2008 | Tse | ...................... | H04N 1/3871 358/1.9 |
| 2002/0081036 A1 * | 6/2002 | Okada | .................. | H04N 19/647 382/243 |
| 2007/0086667 A1 * | 4/2007 | Dai | ........................ | G06K 9/342 382/242 |
| 2009/0324068 A1 * | 12/2009 | Yamakawa | ......... | H04N 1/40062 382/165 |
| 2010/0040291 A1 * | 2/2010 | Genda | ..................... | G06T 3/403 382/199 |
| 2010/0245870 A1 * | 9/2010 | Shibata | .................. | G06K 9/033 358/1.9 |

FOREIGN PATENT DOCUMENTS

JP    03-254574 A    11/1991

* cited by examiner

*Primary Examiner* — Jingge Wu
(74) *Attorney, Agent, or Firm* — Muncy, Geissler, Olds & Lowe, P.C.

(57) ABSTRACT

An image processing apparatus that generates contour information of an image object included in input image data and compresses image data using the contour information includes a smoothing processing part that performs a smoothing process on the input image data; a contour extraction part that extracts the contour information of the image object included in the image data on which the smoothing process is performed; and a contour correction part that corrects the contour information extracted by the contour extraction part.

5 Claims, 13 Drawing Sheets

| $\frac{1}{256}$ | $\frac{4}{256}$ | $\frac{6}{256}$ | $\frac{4}{256}$ | $\frac{1}{256}$ |
|---|---|---|---|---|
| $\frac{4}{256}$ | $\frac{16}{256}$ | $\frac{24}{256}$ | $\frac{16}{256}$ | $\frac{4}{256}$ |
| $\frac{6}{256}$ | $\frac{24}{256}$ | $\frac{36}{256}$ | $\frac{24}{256}$ | $\frac{6}{256}$ |
| $\frac{4}{256}$ | $\frac{16}{256}$ | $\frac{24}{256}$ | $\frac{16}{256}$ | $\frac{4}{256}$ |
| $\frac{1}{256}$ | $\frac{4}{256}$ | $\frac{6}{256}$ | $\frac{4}{256}$ | $\frac{1}{256}$ |

| $\frac{1}{4096}$ | $\frac{6}{4096}$ | $\frac{15}{4096}$ | $\frac{20}{4096}$ | $\frac{15}{4096}$ | $\frac{6}{4096}$ | $\frac{1}{4096}$ |
|---|---|---|---|---|---|---|
| $\frac{6}{4096}$ | $\frac{36}{4096}$ | $\frac{90}{4096}$ | $\frac{120}{4096}$ | $\frac{90}{4096}$ | $\frac{36}{4096}$ | $\frac{6}{4096}$ |
| $\frac{15}{4096}$ | $\frac{90}{4096}$ | $\frac{225}{4096}$ | $\frac{300}{4096}$ | $\frac{225}{4096}$ | $\frac{90}{4096}$ | $\frac{15}{4096}$ |
| $\frac{20}{4096}$ | $\frac{120}{4096}$ | $\frac{300}{4096}$ | $\frac{400}{4096}$ | $\frac{300}{4096}$ | $\frac{120}{4096}$ | $\frac{20}{4096}$ |
| $\frac{15}{4096}$ | $\frac{90}{4096}$ | $\frac{225}{4096}$ | $\frac{300}{4096}$ | $\frac{225}{4096}$ | $\frac{90}{4096}$ | $\frac{15}{4096}$ |
| $\frac{6}{4096}$ | $\frac{36}{4096}$ | $\frac{90}{4096}$ | $\frac{120}{4096}$ | $\frac{90}{4096}$ | $\frac{36}{4096}$ | $\frac{6}{4096}$ |
| $\frac{1}{4096}$ | $\frac{6}{4096}$ | $\frac{15}{4096}$ | $\frac{20}{4096}$ | $\frac{15}{4096}$ | $\frac{6}{4096}$ | $\frac{1}{4096}$ |

IMAGE PROCESSING APPARATUS

CROSS REFERENCE

The present application is related to, claims priority from and incorporates by reference Japanese Patent Application No. 2013-225616, filed on Oct. 30, 2013.

TECHNICAL FIELD

The present invention relates to an image processing apparatus that compresses image data.

BACKGROUND

An image processing apparatus that optically reads image of documents and the like recorded on sheets and the like and generates image data that is electronic data of the image is widely used in a field of a scanner device, facsimile device (hereinafter called as fax), copier, and multi functional peripheral that includes multi functions of such devices. The generated image data is transmitted by facsimile transmission, emails, and so on, and is used by storing in database. Image data generated by optically reading image has usually a large data size so that compression of image data is necessary for efficient performance of the transmission and storing.

From old ago, for compression of image data, data such as characters are binarized first, and then compression (for example, compression such as modified modified relative element address designate (READ) (MMR)) suitable for the binarized data is performed. Also, in recent years, for example as described in JP Laid-Open Patent Application Publication H03-254574, a compression method based on layer separation such as mixed raster content (MRC) has been used. In the compression method, on a document that color image and characters are mixed, a character part is extract, shape information of the extracted character part is binarized, image of the character part and image of non-character part are separated based on the binarized shape information, and compressions respectively suitable for the shape information of the character part and the separated image are performed. Even in this case, for shape information of characters, binarization is performed first, and then compression suitable for the binarized data is performed. For the extraction of the character part, a method for extracting only outline parts of the character parts by evaluating edge components of image data is easy to be processed in a hard ware, so the method is widely used.

However, a conventional image processing apparatus has following problems. Generally, in a case of a document and the like that is recorded on paper and the like, halftone is reproduced by pseudo gradation expression using halftone dots and the like. Therefore, when contour of image reproduced using halftone dots and the like is extracted, a complex pattern of the halftone dots and the like is also binarized and is compressed as binarization data. As a result, data size after the compression is large. Also, when an edge component is evaluated, contour part shape becomes complex due to unstableness of edge, and as a result, data size after the compression is large.

SUMMARY

An image processing apparatus, which is disclosed in the application, that generates contour information of an image object included in input image data and compresses image data using the contour information includes a smoothing processing part that performs a smoothing process on the input image data; a contour extraction part that extracts the contour information of the image object included in the image data on which the smoothing process is performed; and a contour correction part that corrects the contour information extracted by the contour extraction part.

In another aspect, an image processing apparatus that generates contour information of an image object included in input image data and compresses image data using the contour information is disclosed. The apparatus includes a specific pattern region judgment part that judges whether the input image data is a specific pattern region for each pixel and outputs a region judgment result; a contour extraction part that extracts the contour information of the image object included in the input image data; and a contour correction part that corrects the contour information extracted by the contour extraction part based on the region judgment result.

According to the image processing apparatus of the present invention, contour information is extracted using image data after smoothing input image data. For example, complex pattern of halftone dots and the like is not included in contour information after correction, and furthermore, contour part shape due to unstableness of edge can be corrected. Therefore, data size after compression can be decreased.

BRIEF DESCRIPTION OF DRAWINGS

FIGS. 11A to 11C show examples of image of a character of thin lines and the like.

FIGS. 12A-1 to 12B-2 show examples of contour information corrected with two configurations.

DETAILED DESCRIPTION OF EMBODIMENTS

Embodiments that embody the present invention will be apparent as following description of examples of preferable embodiments is read referring to the attached drawings. However, the drawings are for explanation, and are not restrictive of the scope of the present invention.

First Embodiment

Configuration of First Embodiment

Figure 1:
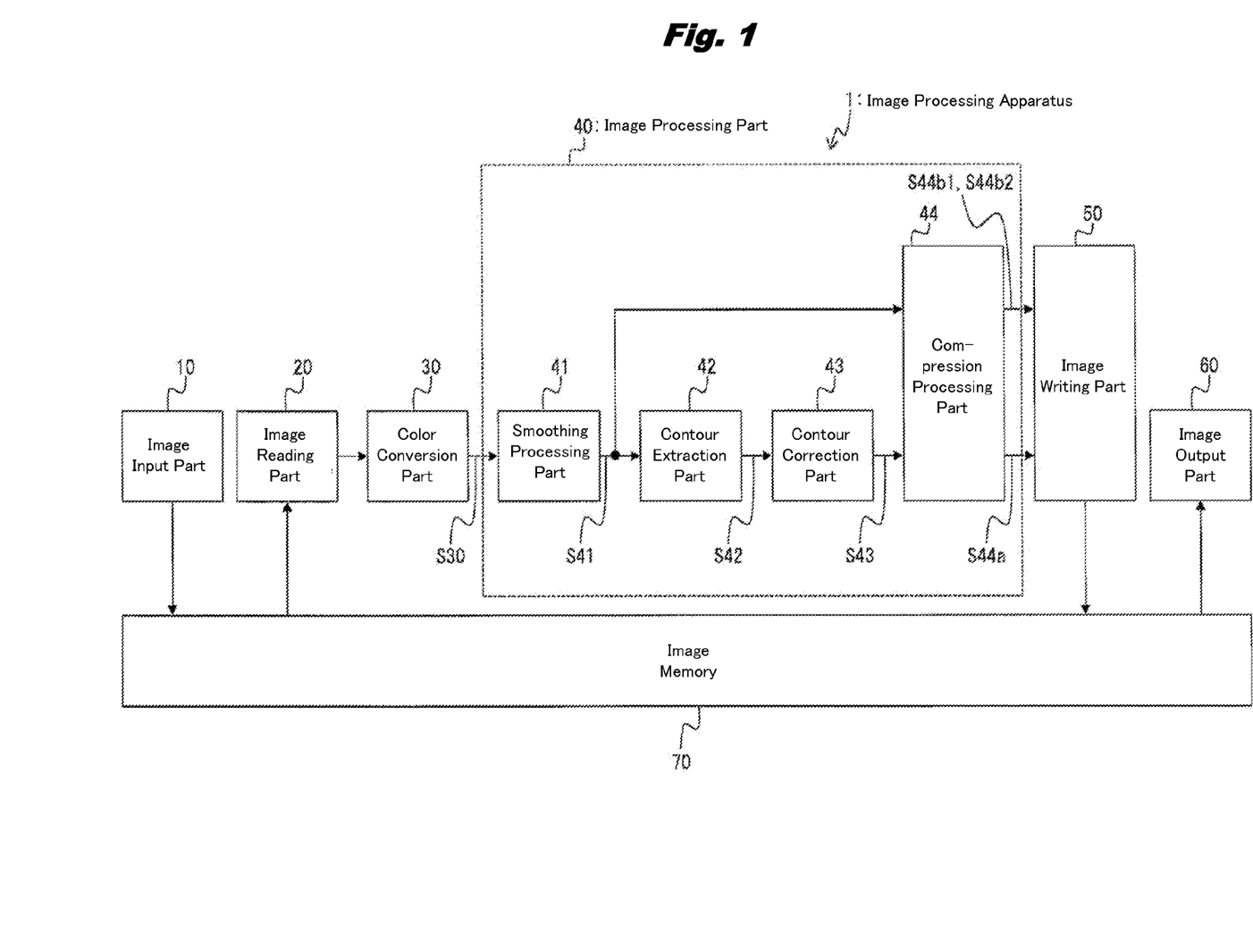
FIG. 1 is a configuration view that shows an outline of an image processing apparatus according to a first embodiment of the present invention.

FIG. 1 is a configuration view that shows an outline of an image processing apparatus according to the first embodiment of the present invention.

The image processing apparatus 1 includes an image input part 10, an image reading part 20, a color conversion part 30 that is connected to an output side of the image reading part 20, an image processing part 40 that is connected to an output side of the image processing part 40, an image writing part 50 that is connected to an output side of the image processing part 40, and an image output part 60. An image memory 70 is connected to an output side of the image input part 10, an output side of the image reading part 20, an output side of the image writing part 50, and an input side of the image output part 60.

The image input part 10 is configured with a scanner, a network interface (hereinafter, referred to as "network IF"), and the like, and has a function of reading image data from a manuscript placed on the scanner, and a function of writing image data to the image memory 70, the image data obtained by receiving the image data sent from a host personal computer (hereinafter, referred to as "host PC") via the network IF. The image reading part 20 reads the image data written in the image memory 70 and sends the data to the color conversion part 30.

The color conversion part 30 converts a color space (for example, RGB (read green blue) color space and the like) of the image data input by the image reading part 20 to a predetermined color space (for example, YCbCr color space and the like), and send the image data to the image processing part 40. YCbCr color space is a format that expresses colors using three information that are a luminance signal Y, a difference Cb of the luminance signal Y and a blue component B, and a difference Cr of the luminance signal Y and a red component R. Note, when a color space of input image is a predetermined color space, the color conversion part 30 is unnecessary.

The image processing part 40 performs an image process on image data S30 that is input from the color conversion part 30, generates compressed contour information S44a, foreground image data S44b1, and foreground image data S44b2, and sends to the image writing part 50. The image processing part 40 is configured with a smoothing processing part 41 that is connected to the output side of the color conversion part 30, a contour extraction part 42 that is connected to an output side of the smoothing processing part 41, a contour correction part 43 that is connected to an output side of the contour extraction part 42, and a compression processing part 44 that is connected to an output side of the contour correction part 43 and the output side of the smoothing processing part 41.

In the image processing part 40, the smoothing processing part 41 performs a smoothing process on the image data S30 input from the color conversion part 30, the contour extraction part 42 extracts contour information S42 of an image object included in the image data S41 on which the smoothing process is performed, the contour correction part 43 corrects (in another word, modifies) the extracted contour information S43 of the image object, the compression processing part 44 compresses the corrected contour information S43, and the compressed contour information S44a that is compressed is sent to the image writing part 50. Furthermore, the image processing part 40 has a function that divides the smoothed image data 41 into the foreground image data S44b1 and the background image data S44b2 based on the corrected contour information S43 and sends the foreground image data S44b1 and the background image data S44b2 to the image writing part 50.

The image writing part 50 writes image data processed in the image processing part 40 (that is the compressed contour information S44a, the foreground image data S44b1 and the background image data S44b2) in the image memory 70. Furthermore, the image output part 60 is configured with a network IF and the like, and has a function that reads image data written in the image memory 70 (that is the compressed contour information S44a, the foreground image data S44b1 and the background image data S44b2) and sends the data to an external connected device via the network IF and the like.

Figure 2:
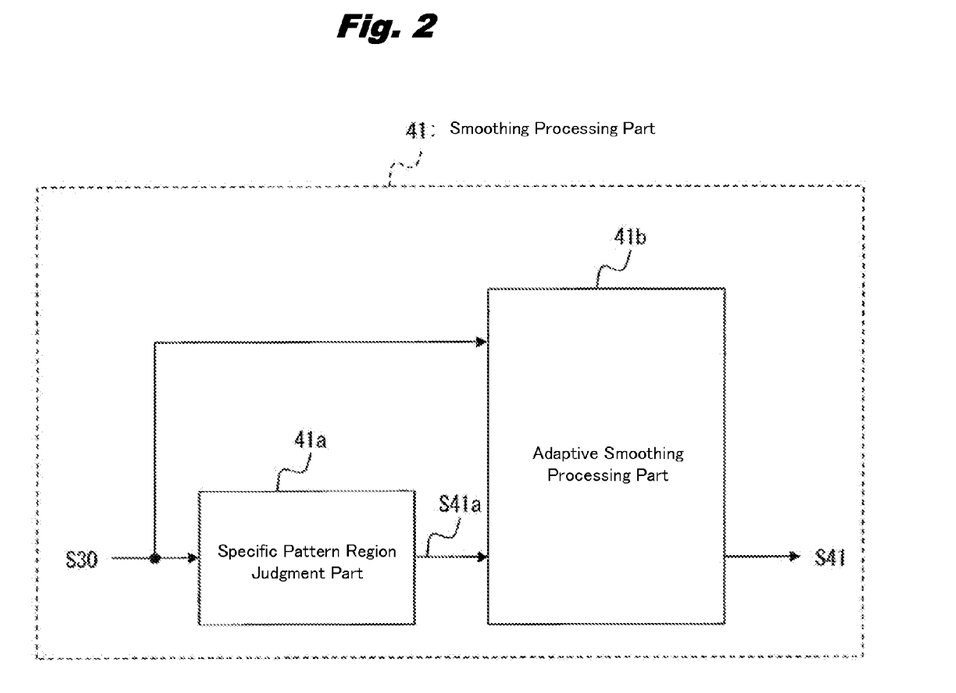
FIG. 2 is a configuration view that shows one example of a smoothing processing part in FIG. 1.

FIG. 2 is a configuration view that shows one example of the smoothing processing part 41 in FIG. 1. The smoothing processing part 41 is configured with a specific pattern region judgment part 41a to which the image data S30 is input and that outputs a region judgment result S41a, and an adaptive smoothing processing part 41b that is connected to an output side of the specific pattern region judgment part 41a. In the smoothing processing part 41, the specific pattern region judgment part 41a judges whether the input image data S30 is a pattern region of halftone dot, thin line, and the like for each pixel, and the adaptive smoothing processing part 41b performs a smoothing process on the region judgment result S41a for each pixel region.

For region judgment on each pixel performed by the specific pattern region judgment part 41a, various judgment methods have been proposed such as a method using pattern matching, a method of evaluating an edge amount as changing a size and shape of a detection filter, and a method that combines both of the methods, etc. In the judgment method, in case of halftone dot for example, a pattern matching is performed using patterns that has the same number of types of patterns as the number of the lines per inch (may be referred to as lpi) of halftone dot, and from a result of the pattern matching, it is judged whether target image is halftone dot, and if it is so, how many lines per inch the halftone dot has. Also the same in thin lines, judgment can be performed by performing a pattern matching using patterns for thin lines.

The adaptive smoothing process part 41b performs a smoothing process as switching a filter for smoothing the image data S30 for each pixel based on the region judgment result S41a for each pixel.

Figure 3A:
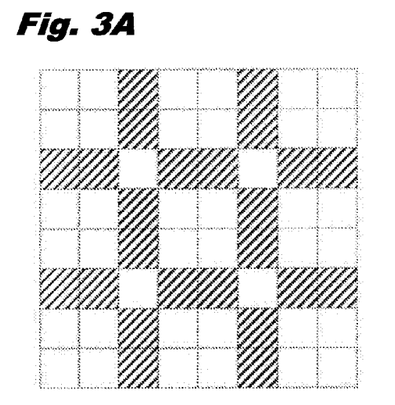
FIGS. 3A-3D show halftone dot patterns and smoothing filters.
Figure 3B:
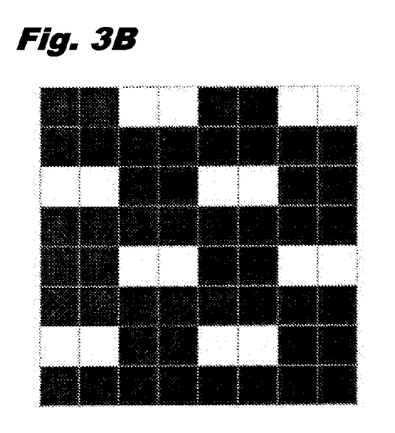
Figure 3C:
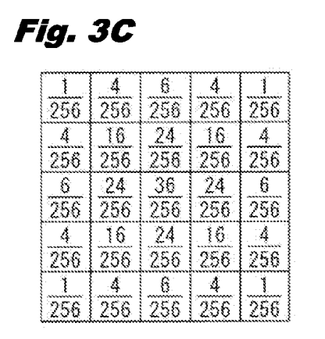
Figure 3D:
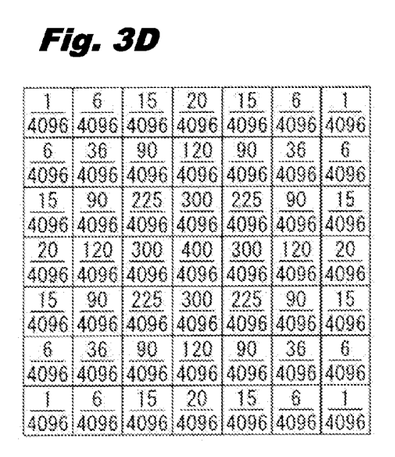

FIGS. 3A-3D show examples of halftone dot patterns and smoothing filters. FIG. 3A is an example of 150 lpi halftone dot of which dot density is 300 dots per inch (dpi). FIG. 3B is an example of 100 lpi of which dot density is 100 dpi. FIG. 3C is an example of a smoothing filter that is applied to FIG. 3A. FIG. 3D is an example of a smoothing filter that is applied to FIG. 3B.

For example, in the smoothing processing part 41 in FIG. 2, when halftone dot patterns such as FIGS. 3A and 3C are input, smoothing filters such as FIGS. 3B and 3D are respectively used and halftone dot region of image can be smoothed.

Note, in the configuration of FIG. 2, an adaptive smoothing process is performed. However, it is also possible to prepare one smoothing filter for low lpi and perform only one type of smoothing process uniformly to all pixels.

Figure 4:
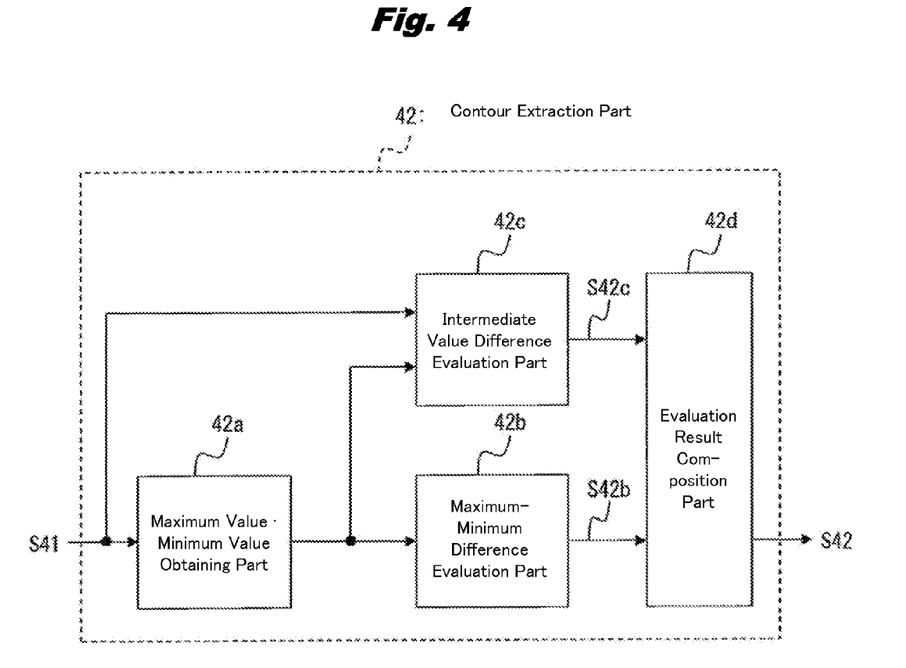
FIG. 4 is a configuration view that shows one example of a contour extraction part in FIG. 1.

FIG. 4 is a configuration view that shows one example of the contour extraction part 42 in FIG. 1. The contour extraction part 42 is configured with a maximum value-minimum value obtaining part 42a to which the smoothed image data S41 is input, a maximum-minimum difference evaluation part 42b that is connected to an output side of the maximum value-minimum value obtaining part 42a, an intermediate value difference evaluation part 42c that is connected to an output side of the maximum value-minimum value obtaining part 42a, and an evaluation result composition part 42d that is connected to an output side of the maximum-minimum difference evaluation part 42b and an output side of the intermediate value difference evaluation part 42c.

In the contour extracting part 42, the maximum value-minimum value obtaining part 42a obtains a maximum pixel value and a minimum pixel value in a predetermined region centering a target pixel, and the maximum-minimum difference evaluation part 42b evaluates a difference value between the obtained maximum pixel value and minimum pixel value (for example, when the difference value is a predetermined threshold or more, "1" of a first evaluation result S42b "1" is output). Then, the intermediate value difference evaluation part 42c evaluates a difference value between a target pixel value and an intermediate pixel value between the obtained maximum pixel value and minimum pixel value (namely, an average pixel value of the maximum pixel value and the minimum pixel value) (namely, when a pixel value is based on luminance and when the difference value is a predetermined threshold or more, "1" of second evaluation result S42c is output). Then, the evaluation result composition part 42d composites (for example, obtains logical product (hereinafter, referred to as "AND")) the first evaluation result S42b of the maximum-minimum difference evaluation part 42b and the second evaluation result S42c of the intermediate value difference evaluation part 42c, and a result of the composition is output as contour information S42.

Respective rules of the maximum-minimum difference evaluation part 42b and the intermediate value difference evaluation part 42c that are two evaluation parts are as follows.

In the maximum-minimum difference evaluation part 42b, binarization of a boundary part of an object is performed by comparing a target pixel value and an intermediate value between a maximum pixel value and minimum pixel value of a local region. For example, when a mark of a difference between a target pixel value and an intermediate value is positive, an evaluation result is "1." However, because a difference between a maximum pixel value and a minimum pixel value is small in an even part of image, even fine bumps are binarized. In order to solve this problem, when the maximum-minimum difference evaluation part 42b evaluates a maximum pixel value and a minimum pixel value, it evaluates a certainly even portion to have "0" as an evaluation result, and binarization of fine bumps on an even portion is restricted by composing the evaluation results S42b and S42c of the maximum-minimum difference evaluation part 42b and the intermediate value difference evaluation part 42c.

Figure 5:
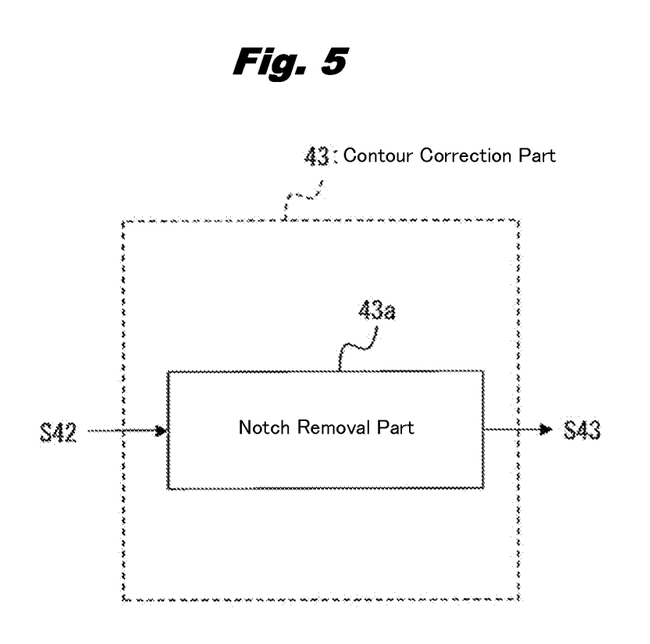
FIG. 5 is a configuration view that shows one example of another contour extraction part in FIG. 1.

FIG. 5 is a configuration view that shows one example of the contour extraction part 43 in FIG. 1. The contour correction part 43 is configured with a notch removal part 43a, and has a function that corrects contour information S42 extracted by the contour extract part 42 and outputs the corrected contour information S43.

Figure 6:
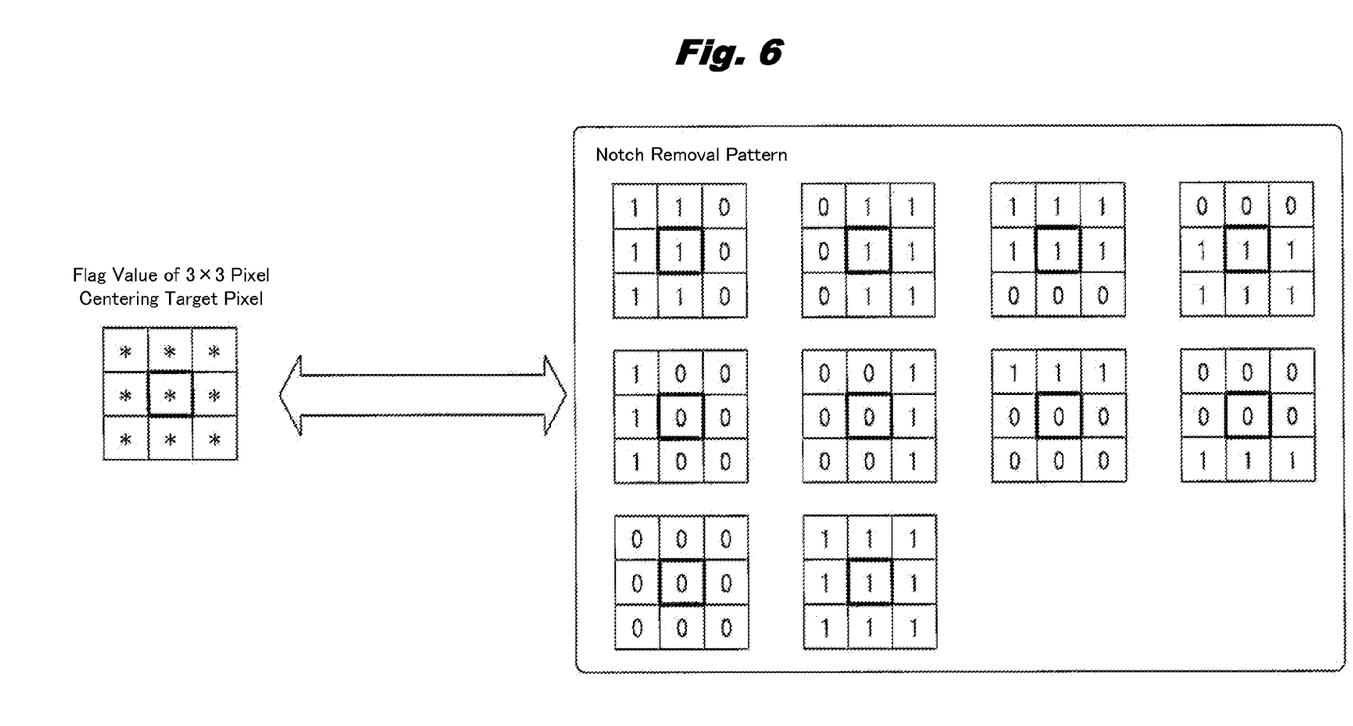
FIG. 6 shows one example of a notch removal pattern.

FIG. 6 shows one example of a notch removal pattern. A left side of FIG. 6 shows a flag value of 3×3 pixel centering a target pixel, and a right side of FIG. 6 shows 10 types of notch removal patterns.

The notch removal part 43a in FIG. 5 is for removing isolated pixels. For example, as illustrated in FIG. 6, status (0 or 1) of 8 pixels surrounding a target pixel are compared with the 10 types of notch removal patterns that has been prepared in advance. Then, in case of being matched, a status of the target pixel is replaced (in other words, a value of the target pixel is replaced with a value of a center of a matched pattern (value in a thick line box in FIG. 6), and then the isolated pixel is removed.

Figure 7:
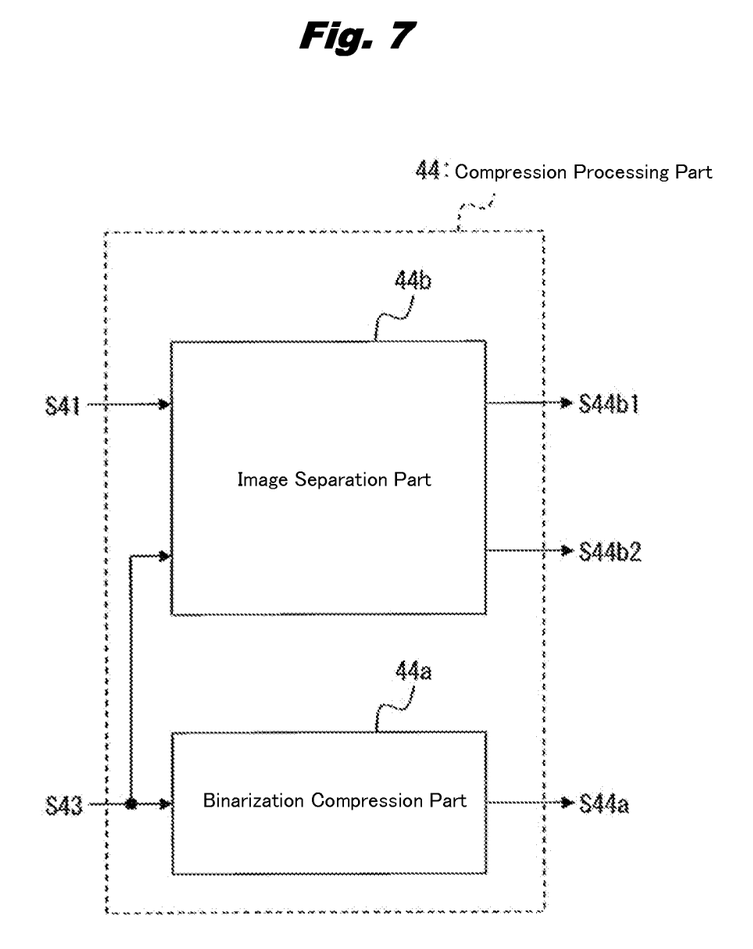
FIG. 7 is a configuration view that shows one example of a compression processing part in FIG. 1.

FIG. 7 is a configuration view that shows one example of the compression processing part 44 in FIG. 1. The compression processing part 44 has a configuration for realizing compression in a MRC encoding method, for example, and is configured with a binarization compression part 44a and an image division part 44b. The binarization compression part 44a compresses the contour information S43 input from the contour correction part 43 in a compression way suitable for compression of binarization data such as a MMR encoding system and the like. The image division part 44b divides the image data S41 on which a smoothing process is performed by the smoothing process part 41 into the foreground image data S44b1 and the background image data S44b2 that is other than contour parts, and sends them to the image writing part 50.

Note, in the configuration of the present first embodiment, binarization compression is performed in the compression processing part 44. However, it is also possible that central processing unit (CPU) may perform a compression process after writing in the memory and the like.

Performance of First Embodiment

Overall performances of the image processing apparatus 1 (1) and performances of the image processing part 40 are explained.

(1) Overall Performances of the Image Processing Apparatus 1

In FIG. 1, the image input part 10 reads image data from a manuscript placed on a scanner, and writes image data obtained by receiving image data sent from a host PC via a network IF in the image memory 70. The image data written in the image memory 70 is read by the image reading part 20 and sent to the color conversion part 30. The color conversion part 30 converts a color space of the image data input by the image reading part 20 to a predetermined color space.

The image processing part 40 performs a predetermined image process on the converted image data S30, and then the compressed contour information S44a, foreground image data S44b1, and background image data S44b2 are generated. The generated compressed contour information S44a, foreground image data S44b1, and background image data S44b2 are written in the image memory 70 by the image writing part 50. Then, the compressed contour information S44a, foreground image data S44b1, and background image data S44b2 written in the image memory 70 is read by the image output part 50, and sent to an external connected device via a network IF and the like.

(2) Performances of the Image Processing Part 40

Figure 8A:
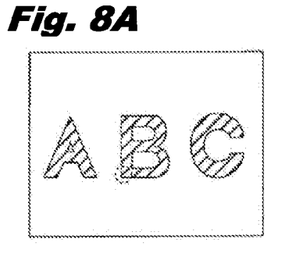
FIGS. 8A-8D show examples of image expressed with 100 lpi halftone dot.
Figure 8B:
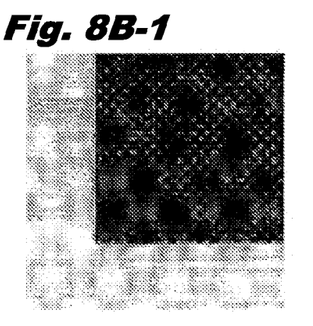
Figure 8B:
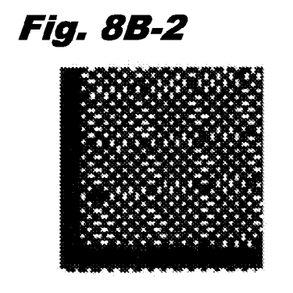
Figure 8C:
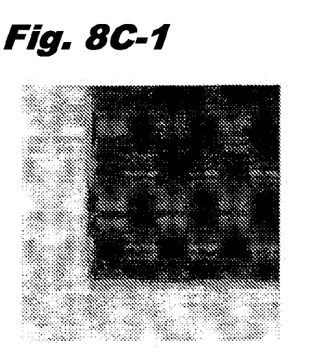
Figure 8C:
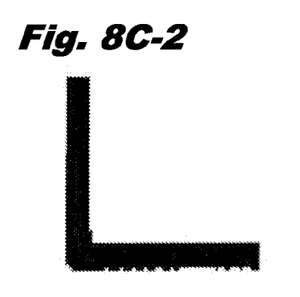
Figure 8D:
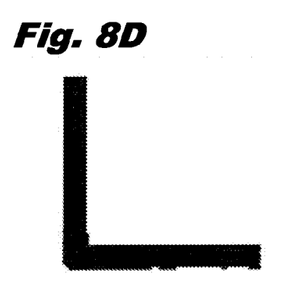

FIGS. 8A-8D show examples of image expressed with 100 lpi halftone dot. FIG. 8A shows characters "ABC" of an example of input image data. FIG. 8B-1 shows image before a smoothing process that is enlarged and displayed and is expressed with 100 lpi halftone dot. FIG. 8B-2 shows contour information of the image before the smoothing process. FIG. 8C-1 shows image after the smoothing process. FIG. 8C-2 shows contour information of the image after the smoothing process. FIG. 8D shows contour information of a corrected image.

The image data S30 shown in FIG. 8A is input to the image processing part 40 in FIG. 1. On the image data S30 input to the image processing part 40, the smoothing process is performed by the smoothing processing part 41. A 100 lpi halftone dot part is smoothed by the smoothing filter shown in FIG. 3D. As illustrated in FIG. 8C-1, a pattern of halftone dot has been removed in the image after the smoothing process by the smoothing process.

The contour information S42 of the smoothed image data S41 is extracted by the contour extraction part 42. The extracted contour information S42 is shown in FIG. 8C-2.

In the present first embodiment, a maximum pixel value and a minimum pixel value are obtained in 15×15 of pixel area centering a target pixel by the maximum value·minimum value obtaining part 42a in the contour extraction part 42 in FIG. 4. Based on the obtained maximum value and minimum value, an evaluation is performed by the maximum-minimum difference evaluation part 42*b* and the intermediate value difference evaluation part 42*c*. Then, the evaluation result composition part 42*d* composites the first evaluation result S42*b* from the maximum-minimum difference evaluation part 42*b* and the second evaluation result S42*c* from the intermediate value difference evaluation part 42*c*, and extraction of the contour information S42 is performed.

FIG. 8B-2 shows contour information extracted from the image data S30 before the smoothing process as a parameter for extracting is set to be the same condition. In a case that contour information is extracted from the image data S30 before the smoothing process, it can be seen that a complex pattern of the halftone dot exists in binarized information. On the other hand, in a case that the contour information is extracted from the image data S41 after the smoothing process, it can be seen that no complex pattern of the halftone dot exists as illustrated in FIG. 8C-2.

The contour information S42 extracted by the contour extraction part 42 is corrected by the contour correction part 43. FIG. 8D shows corrected contour information S43. As illustrated in FIG. 8C-2, it can be seen that a noise component remaining in the vicinity of a boundary of the contour information S42 before the correction is reduced by the correction process by the contour correction part 42. The corrected contour information S43 is compressed by the compression processing part 44, and is output.

Effects of First Embodiment

According to the first embodiment, the contour information S42 that is a binarization target is extracted from the image data S41 after smoothing a halftone dot pattern by the image processing part 40. Therefore, a complex pattern such as halftone dot doesn't appear in binarization data, and a contour part shape caused by an unstableness of edge can be corrected. As a result, data size after compression can be reduced.

Second Embodiment

The smoothing process and the extraction process for the contour information requires a maximum pixel and a minimum pixel to be referred, so that in a case of configuring with a hard wear, line memories (memories that memorize data for one scan line) such as static RAMs (SRAM) are required. With the configuration of the first embodiment, the smoothing process is performed on the input image data S30 by the smoothing processing part 41, and the contour information S42 is extracted from the smoothed image data S41 by the contour extraction part 42. Therefore, a line memory for performing the smoothing process on the input image data S30 and another line memory for performing the extraction process on the contour information S42 are required. As a result, there is a disadvantage that the cost of the hard wear may go up. In order to resolve such disadvantage, the second configuration is configured as described below.

Configuration of Second Embodiment

Figure 9:
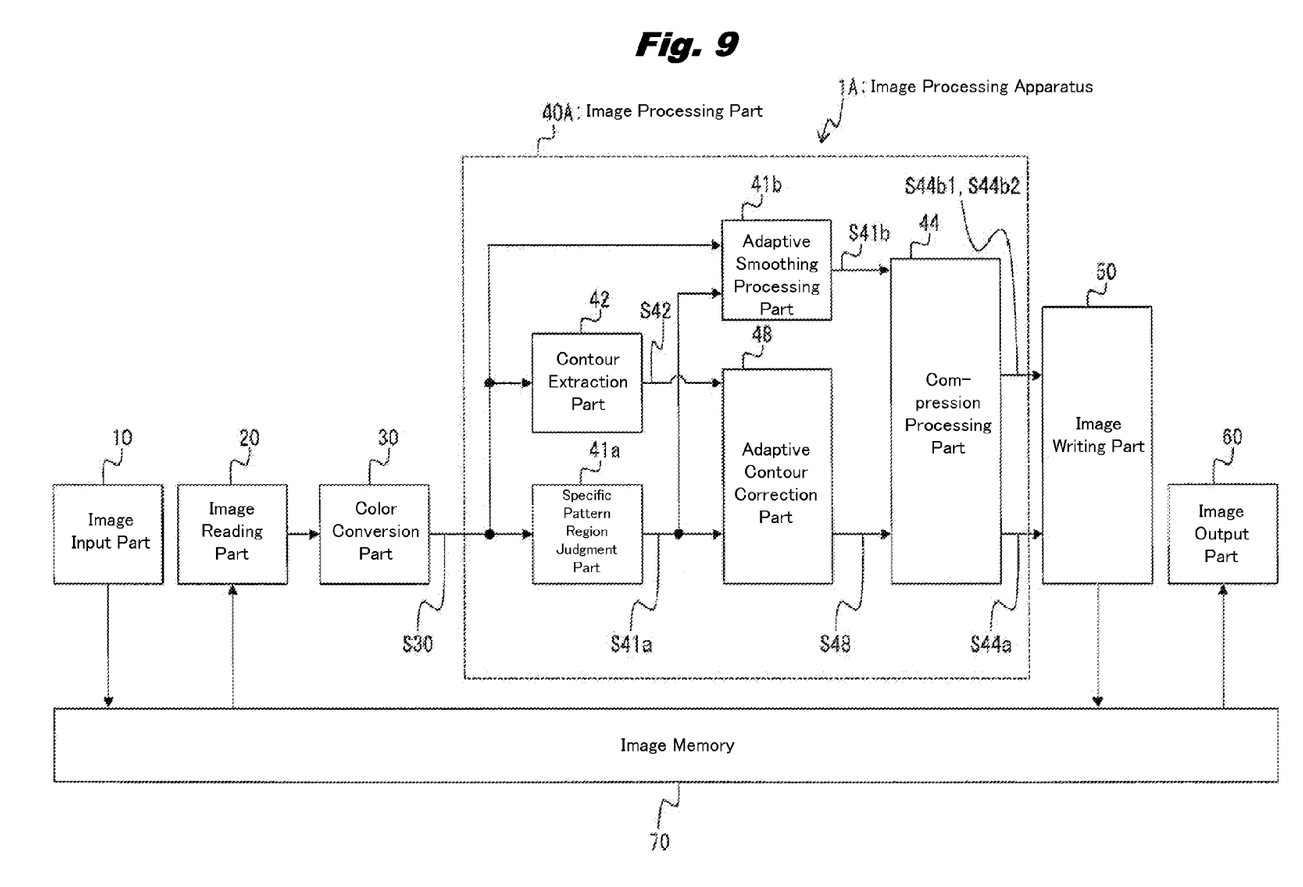
FIG. 9 is a configuration view that shows an outline of an image processing apparatus according to a second embodiment of the present invention.

FIG. 9 is a configuration view that shows an outline of an image processing apparatus according to a second embodiment of the present invention. The same reference numbers are given to elements that are in common with the elements illustrated in FIG. 1 that shows the image processing apparatus 1 of the first embodiment.

In an image processing apparatus 1A in the present second embodiment, instead of the image processing part 40 in the first embodiment, an image processing part 40A having a different configuration is provided. The other configurations than the image processing part 40A are the same as those in the first embodiment.

The image processing part 40A according to the second embodiment has the specific pattern region judgment part 41*a*, the contour extraction part 42, and the adaptive smoothing processing part 41*b* that are the same as the first embodiment, an adaptive contour correction part that is connected to output sides of the specific pattern region judgment part 41*a* and the contour extraction part 42 and that is different from the first embodiment, and the compression processing part 44 that is connected to the output side of the adaptive smoothing process part 41*b* and an output side of the adaptive contour correction part 48 and that is the same as the first embodiment.

As the same as the first embodiment, the specific pattern region judgment part 41*a* judges whether the input image data S30 is a pattern region of halftone dot, thin line, and the like for each pixel, the input image data S30 being input from the color conversion part 30, and outputs the region judgment result S41*a* to the adaptive contour correction part 48 and the adaptive smoothing process part 41*b*. As the same as the first embodiment, the contour extraction part 42 extracts the contour information S42 of an image object included in the image data S30 input from the color conversion part 30, and outputs to the adaptive contour correction part 48. As being different from the first embodiment, the adaptive contour correction part 48 adaptively corrects the extracted contour information S42 based on the region judgment result S41*a*, and outputs the corrected contour information S48 to the compression processing part 44.

As the same as the first embodiment, the adaptive smoothing processing part 41*b* adaptively performs the smoothing process on the image data S30 input from the color conversion part 30 based on the region judgment result S41*a*, and outputs the smoothed image data S41*b* to the compression processing part 44. As the same as the first embodiment, the compression processing part 44 performs the compression process on the corrected contour information S48 and the smoothed image data S41*b*, and then outputs the compressed contour information S44*a*, the foreground image data S44*b*1, and the background image data S44*b*2 to the image writing part 50.

Figure 10:
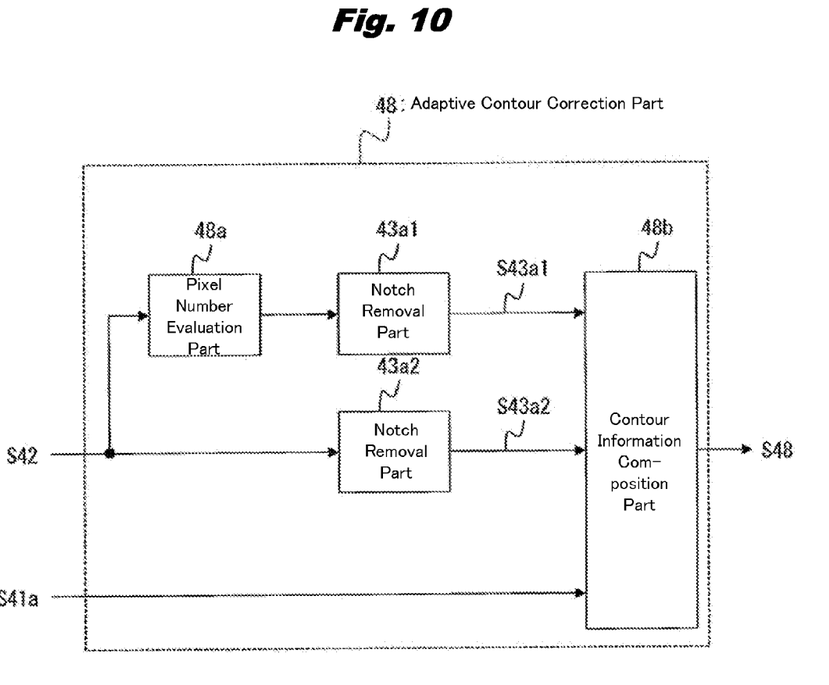
FIG. 10 is a configuration view that shows one example of an adaptive contour correction part in FIG. 9.

FIG. 10 is a configuration view that shows one example of the adaptive contour correction part 48 in FIG. 9. The adaptive contour correction part 48 is configured with a pixel number evaluation part 48*a* to which the contour information S42 extracted by the contour compression part 42 is input, a notch removal part 43*a*1 connected to an output side of the pixel number evaluation part 48*a*, a notch removal part 43*a*2 to which the contour information S42 is input, and a contour data composition part 48*b* connected to output sides of the notch removal parts 43*a*1 and 43*a*2. In other words, the contour information S42 extracted by the contour extraction part 42 is corrected by both of following two configurations: a configuration that the pixel number evaluation part 48*a* and the notch removal part 43*a*1 are linked in serial; and a configuration that configured with only the notch removal part 43*a*2. Then, corrected first contour information S43*a*1 and second contour information S43*a*2 are input to the contour data composition part 48*b*.

The pixel number evaluation part 48*a* inputs the contour information S42, counts a status (0 or 1) of a pixel in a predetermined region centering a target pixel for each pixel, evaluates a count value obtained from the counting and corrects the status of the pixel, and outputs an evaluation result S48a to the notch removal part 43a1. For example, when the number of pixels whose status is "1" in pixels surrounding 3×3 pixels is less than 5, the pixels are corrected to output "0", and when the number of pixels whose status is "1" in pixels surrounding 3×3 pixels is 5 or more, the pixels are corrected to output "1." The evaluation result S48a that shows the status of the corrected pixels is output to the notch removal part 43a1. As the same as the notch removal part 43a in FIG. 5 in the first embodiment, the notch removal part 43a1 inputs the evaluation result S48a, corrects pixel status as comparing with 10 types of patterns prepared in advance, and output the corrected first contour information S43a1 to the contour information composition part 48b.

As the same as the notch removal part 43a in FIG. 5 in the first embodiment, the notch removal part 43a2 inputs the contour information S42, corrects the pixel status as comparing with 10 types of patterns prepared in advance, and outputs the corrected second contour information S43a2 to the contour information composition part 48b. The contour information composition part 48b selects either the first contour information S43a1 or the second contour information S43a2 for each pixel from the input first and second contour information S43a1 and S43a2 based on the region judgment result S41a for each pixel, and outputs the selected contour information S48. For example, the contour information composition part 48b selects the second contour information S43a2 to a pixel judged whose region judgment result S41a is a thin line, and selects the first contour information S43a1 to other pixels, and outputs the information.

Performance of Second Embodiment

An overall performance of the image processing apparatus 1A in the second embodiment is almost the same as the overall performance of the image processing apparatus 1 in the first embodiment. The configuration of the image processing part 40A in the second embodiment is different from the image processing part 40 in the first embodiment, so performances of the image processing part 40A in the second embodiment are explained as referring to FIGS. 8A-8D, and FIG. 11A to FIG. 13B.

Figure 11A:
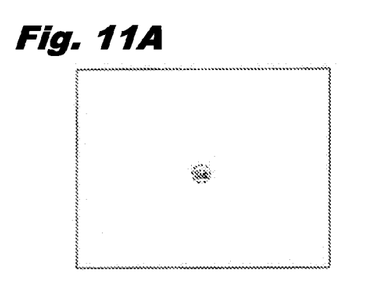
Figure 11B:
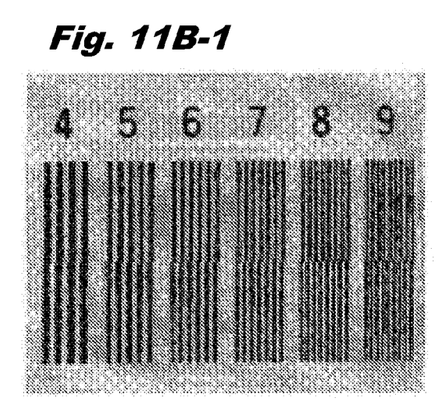
Figure 11B:
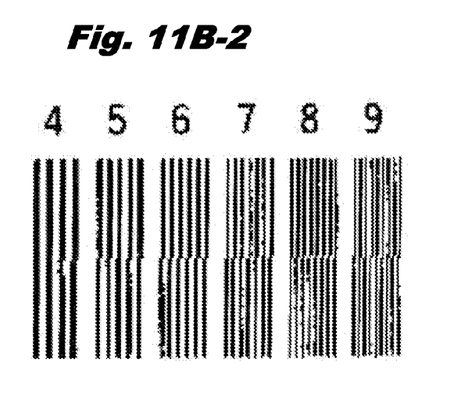
Figure 11C:
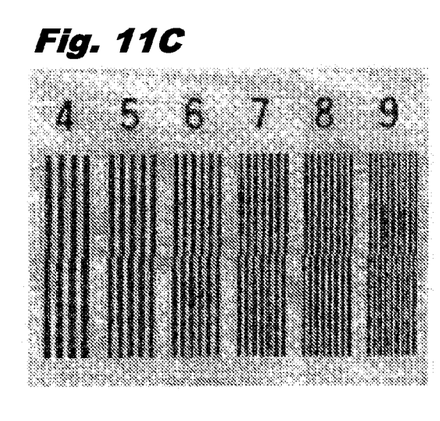
Figures 12A, 12A:
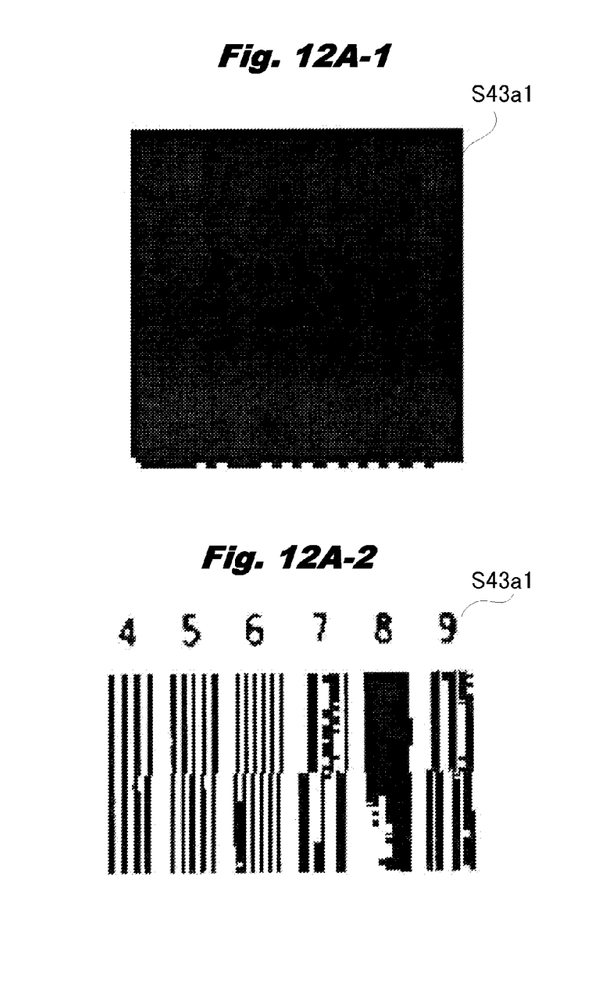
Figure 12B:
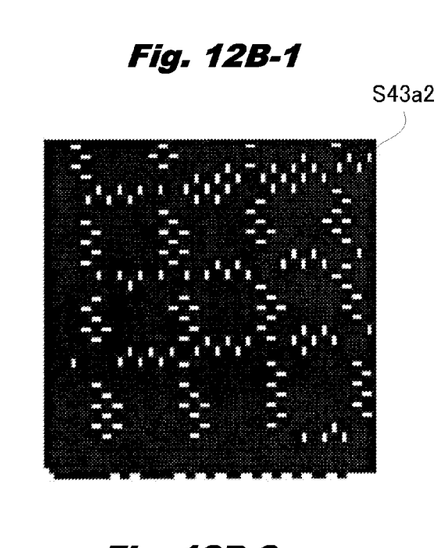
Figure 12B:
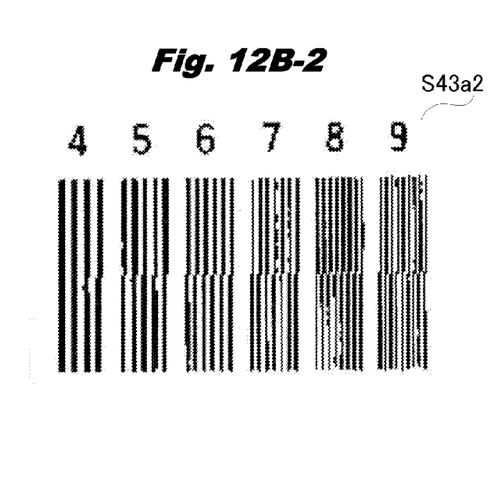
Figure 13A:
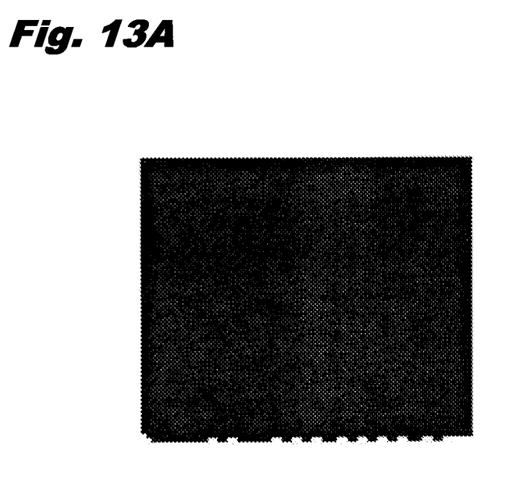
FIGS. 13A and 13B show an example of contour information composited based on a region judgment result.
Figure 13B:
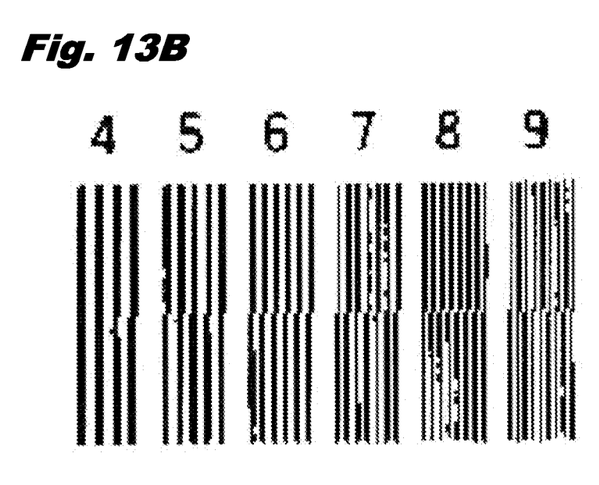

FIGS. 11A to 11C show examples of image of a character of thin lines and the like. FIG. 11A shows an example of input image. FIG. 11B-1 shows an example of image before a smoothing process. FIG. 11B-2 shows an example of contour information of image before the smoothing process. FIG. 11C is an example of image after the smoothing process. FIGS. 12A-1 through 12B-2 show examples of contour information corrected by two configurations. FIGS. 12A-1 and 12A-2 show an example of the corrected contour information S43a1, and FIG. 12B-1 and FIG. 12B-2 show an example of the corrected contour information S43a2. FIG. 13A shows example of contour information composited based on the region judgment result. FIG. 13B shows an example of a result that the image of FIG. 11A was processed by the second embodiment and was output.

For example, a performance in a case that the image data S30 illustrated in FIG. 8A and FIG. 11A is input to the image processing part 40A is explained.

In the image of the image data S30 illustrated in FIG. 8A, letters "ABC" are illustrated. The image of the image data S30 illustrated in FIG. 11A includes thin lines and small letters "456789" as illustrated in an enlarged manner in FIG. 11B-2.

From the image data S30 input to the image processing part 40A, the contour information S42 of the image data S30 is extracted by the contour extraction part 42. From the letter "ABC" illustrated with 100 lpi halftone dot in FIG. 8A, the contour information S42 illustrated in FIG. 8B-2 is extracted. From the thin lines and the small letter "456789" illustrated in FIG. 11A, the contour information S42 illustrated in FIG. 11B-2 is extracted. The extracted contour information S42 is input to the adaptive contour correction part 48.

In parallel with this, the specific pattern region judgment part 41a judges whether the input image data S30 is a pattern region of halftone dot, thin line, and the like for each pixel. Pixels for the letters "ABS" illustrated with 100 lpi halftone dot in FIG. 8A are judged as a halftone dot region. Pixels for the thin lines and the small letters "456789" that are other than the halftone dot region illustrated in FIG. 11B-2 are judged as a thin line region. The region judgment result S41a described above is input to the adaptive contour correction part 48 and the adaptive smoothing processing part 41b.

In the adaptive contour correction part 48, the input contour information S42 is corrected by the notch removal part 43a2 as well as by the pixel number evaluation part 48a and the notch removal part 43a1 in FIG. 10. The first contour information S43a1 corrected by the pixel number evaluation part 48a and the notch removal part 43a1 and the second contour information S43a2 corrected by the notch removal part 43a2 are input to the contour information composition part 48b. The contour information composition part 48b selects either the first contour information S43a1 or the second contour information S43a2 for each pixel from the input first and second contour information S43a1 and S43a2 based on the region judgment result S41a for each pixel, and outputs the selected contour information S48 to the compression processing part 44.

The first contour information S43a1 corrected by the pixel number evaluation part 48a and the notch removal part 43a1 is illustrated in FIGS. 12A-1 and 12A-2, and the second contour information corrected by the notch removal part 43a2 is illustrated in FIGS. 12B-1 and 12B-2. In the first contour information S43a1, a contour of a complex pattern of halftone dot is erased by the correction, but it can be seen that a letter pattern such as thin line is destroyed. On the other hand, in the second contour information S43a2, a contour of a complex pattern of halftone dot remains, but it can be seen that the a letter pattern such as thin lines is not destroyed.

FIGS. 13A and 13B show the contour information S48 composited by the contour information composition part 48b. In other words, the contour information composition part 48b selects either the first contour information S43a1 or the second contour information S43a2 based on the region judgment result S41a for each pixel. For a pixel corresponding to a half dot region (in other words, corresponding to the letters "ABC" illustrated with 100 lpi halftone dot), the first contour information S43a1 is selected. For a pixel corresponding to a thin line region (in other words, corresponding to the thin lines and the small letter "456789"), the second contour information S43a2 is selected. The composited contour information S48 is illustrated in FIG. 13A. As illustrated in FIG. 13A, it can be seen that favorable contour information is obtained that the contour of the complex pattern of halftone dot doesn't remain and the letter pattern such as thin lines are not destroyed.

The contour information S48 composited by the contour information composition part 48b is input to the compression processing part 44. The region judgment result S41a output from the specific pattern region judgment part 41a is smoothed by the adaptive smoothing processing part 41b, and the smoothed image data S41b is input to the compression processing part 44 as same as the first embodiment. The compression processing part 44 performs the compression process the same as the first embodiment, and outputs results of the process that are the compressed contour information S44a, the foreground image data S44b1 and the background image data S44b2 to the image writing part 50.

Note, the adaptive contour correction part 48 according to the second embodiment has the configuration that performs the correction processes that are suitable respectively for the halftone dot region and the other region than the halftone dot region on the contour information S42. However, another configuration that not only uses the region judgment result S41a for the selection but also obtains AND and logical disjunction (OR) for the contour information S42 to be corrected is also applicable. Furthermore, a configuration that performs the correction process as further dividing types of the region judgment is also applicable. For example, the region judgment can be further segmented by 150 lpi halftone dot or 100 lpi halftone dot.

Effects of Second Embodiment

According to the second embodiment, effects (a) and (b) described as follows are obtained.

(a) The adaptive contour correction part 48 corrects the contour information S42 that is a binarization target to erase the complex pattern such as halftone dot so that the complex pattern such as halftone dot is not included in binarization data. As a result, it is possible to make the data size after the compression small. On the other hand, for the letters of thin lines, it is possible to prevent destruction of the letter pattern such as thin line by changing (in other words, weakening) the process of the correction.

(b) In the first embodiment, the contour information S42 is extracted from the smoothed image data S41. On the other hand, in the second embodiment, the contour information S42 is extracted from the image data S30 before the smoothing process. Therefore, it is possible to share one memory for the line memory for performing the smoothing process and the line memory for performing the extraction process of the contour information so that a cost of hard ware can be reduced.

The present invention is applicable to a device such as a scanner, facsimile device, copier, and multifunction peripheral (MPF).

What is claimed is:

1. An image processing apparatus that generates contour information of an image object included in input image data and compresses image data using the contour information, comprising:
   a specific pattern region judgment part that determines if each pixel of the input image data is within a specific pattern region and outputs a region judgment result;
   a contour extraction part that extracts the contour information of the image object included in the input image data; and
   a contour correction part that corrects the contour information extracted by the contour extraction part based on the region judgment result, wherein the contour correction part has:
   a pixel value evaluation part that counts a status of region pixels in a predetermined region adjacent to a first target pixel of the contour information extracted by the contour extraction part, evaluates a count result of the region pixels in the predetermined region, and outputs corrected contour information;
   a first notch removal part that removes a first isolated pixel from the corrected contour information to clarify the corrected contour information, and outputs clarified first contour information;
   a second notch removal part that removes a second isolated pixel from the contour information extracted by the contour extraction part to clarify the corrected contour information, and outputs clarified second contour information; and
   a contour information composition part that selects either the clarified first corrected contour information or the clarified second corrected contour information based on the region judgment result for each pixel, and outputs final contour information of the image object.

2. The image processing apparatus according to claim 1, further comprising:
   a smoothing processing part that performs a smoothing process on the input image data based on the specific pattern region.

3. The image processing apparatus according to claim 2, further comprising:
   a compression processing part that performs a compression process on the final contour information output by the contour correction part.

4. The image processing apparatus according to claim 1, wherein the contour extraction part has:
   a maximum value and minimum value obtaining part that obtains a maximum pixel value and a minimum pixel value in a predetermined region centered on a second target pixel in the input image data;
   a maximum-minimum difference evaluation part that evaluates a difference value between the obtained maximum pixel value and the obtained minimum pixel value and outputs a first evaluation result;
   an intermediate value difference evaluation part that evaluates a difference value between a target pixel value in the input image data and an intermediate pixel value between the obtained maximum pixel value and minimum pixel value, and outputs a second evaluation result; and
   an evaluation result composition part that outputs the contour information of the image object as a result of compositing the first evaluation result and the second evaluation result.

5. The image processing apparatus according to claim 3, wherein the compression processing part has:
   a binarization compression part that performs the compression process on the contour information corrected by the contour correction part, the compression process being suitable for compression of binarization data; and
   an image division part that divides the image data on which the smoothing process is performed into foreground image data and background image data, and outputs them, the foreground image data showing a contour part based on the contour information corrected by the contour correction part, and the background image data being other than the contour part.

* * * * *